(12) United States Patent
Simmons et al.

(10) Patent No.: US 10,982,855 B2
(45) Date of Patent: Apr. 20, 2021

(54) COMBUSTOR CAP ASSEMBLY WITH COOLING MICROCHANNELS

(71) Applicant: General Electric Company, Schenectady, NY (US)

(72) Inventors: Scott Robert Simmons, Simpsonville, SC (US); Charles Lewis Davis, III, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 16/146,388

(22) Filed: Sep. 28, 2018

(65) Prior Publication Data

US 2020/0103114 A1     Apr. 2, 2020

(51) Int. Cl.
*F23R 3/28* (2006.01)
*F02C 7/18* (2006.01)
*F23R 3/06* (2006.01)
*F23R 3/10* (2006.01)

(52) U.S. Cl.
CPC ............... *F23R 3/283* (2013.01); *F02C 7/18* (2013.01); *F05D 2260/201* (2013.01); *F05D 2260/204* (2013.01); *F23R 3/06* (2013.01); *F23R 3/10* (2013.01); *F23R 2900/03043* (2013.01)

(58) Field of Classification Search
CPC .. F23R 3/286; F23R 3/283; F23R 3/34; F23R 3/343; F23R 3/346; F23R 2900/03043; F23R 2900/03045; F23R 2900/00018; F05D 2260/204; F05D 2260/202; F05D 2260/203; F05D 2260/205; F05D 2260/2212; F05D 2260/2214; F05D 2260/22141; F23D 2214/00
See application file for complete search history.

(56) References Cited

U.S. PATENT DOCUMENTS

| | | | |
|---|---|---|---|
| 8,499,566 B2* | 8/2013 | Lacy | F23R 3/005 60/752 |
| 8,522,557 B2* | 9/2013 | Dawson | F23R 3/06 60/752 |
| 8,651,805 B2 | 2/2014 | Lacy et al. | |
| 9,015,944 B2 | 4/2015 | Lacy et al. | |
| 9,650,958 B2* | 5/2017 | DiCintio | F02C 7/16 |
| 9,828,915 B2 | 11/2017 | Miranda et al. | |
| 9,909,432 B2 | 3/2018 | Kottilingam et al. | |
| 2012/0243995 A1 | 9/2012 | Bunker et al. | |

(Continued)

*Primary Examiner* — Gerald L Sung
*Assistant Examiner* — Stephanie Sebasco Cheng
(74) *Attorney, Agent, or Firm* — Charlotte Wilson; James Pemrick (57) ABSTRACT

A combustor cap assembly includes a cap plate and a cover panel. The cap plate defines an outer perimeter and fuel nozzle openings disposed through the cap plate. The cap plate has a hot side, and the cover panel has a cold side, which is attached to the hot side of the cap plate. The hot side of the cap plate and/or the cold side of the cover panel define a plurality of cooling microchannels extending in a transverse direction relative to a centerline of the combustor cap assembly. A first microchannel has a first channel outlet disposed along the outer perimeter of the cap plate, and/or a second microchannel has a second channel outlet disposed within one of the plurality of fuel nozzle openings. The cover panel may be coated with a bond coat and a thermal barrier coating.

18 Claims, 8 Drawing Sheets

(56) References Cited

U.S. PATENT DOCUMENTS

| | | |
|---|---|---|
| 2012/0308843 A1 | 12/2012 | Ott et al. |
| 2014/0170433 A1 | 6/2014 | Schick et al. |
| 2015/0369068 A1* | 12/2015 | Kottilingam ............ F01D 25/12 |
| | | 415/116 |
| 2016/0054004 A1* | 2/2016 | Stoia ........................ F23R 3/04 |
| | | 60/806 |
| 2017/0138595 A1 | 5/2017 | Berry et al. |

* cited by examiner

COMBUSTOR CAP ASSEMBLY WITH COOLING MICROCHANNELS

TECHNICAL FIELD

The present disclosure relates generally to the field of gas turbines and, more particularly, to a cap assembly for a combustor that is provided with cooling microchannels.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary vanes. The compressed air is directed to the one or more combustors, where fuel is introduced, and a fuel/air mixture is ignited and burned to form combustion products. The combustion products function as the operational fluid of the turbine.

The operational fluid then flows through a fluid flow path in a turbine, the flow path being defined between a plurality of rotating blades and a plurality of stationary nozzles disposed between the rotating blades, such that each set of rotating blades and each corresponding set of stationary nozzles defines a turbine stage. As the plurality of rotating blades rotate the rotor of the gas turbine system, a generator, coupled to the rotor, may generate power from the rotation of the rotor. The rotation of the turbine blades also causes rotation of the compressor blades, which are coupled to the rotor.

Within the combustor, fuel nozzles located in the head end of the combustor deliver the fuel and air into a combustion zone defined by the combustor liner for burning. The fuel nozzles are supported by a cap assembly that defines an upstream boundary of the combustion zone. The fuel nozzles themselves are cooled by a first portion of air from the compressor, which is directed around the fuel nozzles and ultimately into the combustion zone.

Some conventional cap assemblies include an effusion plate. The downstream surface of the effusion plate, which is exposed to the high temperatures of the combustion zone, is cooled by passing air through effusion cooling holes and into the combustion zone.

In some instances, this cap assembly has experienced issues impacting its durability. First, the large number of effusion cooling holes may create stress concentrations that increase the risk for fatigue cracks in the cap assembly. Although coating the effusion plate with a thermal barrier coating could potentially mitigate this risk, achieving such a coating has been unfeasible because the effusion cooling holes are very small and because they are distributed in a large number across the effusion plate. As a result, coating the effusion plate tends to block the effusion cooling holes and necessitate the additional and difficult step of drilling through the thermal barrier coating to unblock the effusion cooling holes.

Additionally, the flow of fuel and air in an axial direction through the fuel nozzles may disrupt the film of cooling air provided by the effusion cooling holes, which may lead to hot spots. This potential problem is exacerbated if the effusion cooling holes are not properly located to provide a uniform film of cooling air. In some circumstances, combustion dynamics can reverse the flow of the combustion gases into the cap assembly, leading to a significant increase in cap assembly temperature.

Another challenge faced by gas turbine manufacturers is the paradoxical desire to operate the combustors at higher firing temperatures, while simultaneously reducing the volume of cooling air used to cool the components. Reductions in cooling air volume are directly linked to increases in gas turbine efficiency.

An improved cap assembly that addresses these issues would represent an advancement in the art.

SUMMARY

According to an aspect of the present disclosure, a combustor cap assembly includes a cap plate and a cover panel. The cap plate defines an outer perimeter and fuel nozzle openings disposed through the cap plate. The cap plate has a hot side, and the cover panel has a cold side, which is attached to the hot side of the cap plate. The hot side of the cap plate and/or the cold side of the cover panel define a plurality of cooling microchannels extending in a transverse direction relative to a centerline of the combustor cap assembly. A first microchannel has a first channel outlet disposed along the outer perimeter of the cap plate, and/or a second microchannel has a second channel outlet disposed within one of the plurality of fuel nozzle openings. The cover panel may be coated with a bond coat and a thermal barrier coating.

A combustor having a combustor liner, the present cap assembly, and a plurality of fuel nozzles installed through the plurality of fuel nozzle openings in the present cap assembly is also provided.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current combustor cap assembly with cooling microchannels, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the end cover of the combustor, and "aft" being used to describe components located toward the rearward (or turbine) end of the engine or toward the outlet end of the combustor. The term "hot side" refers to a surface of a component closer to the combustion zone and the combustor outlet, while the term "cold side" refers to a surface of a component distal to the combustion zone and closer to the combustor end cover.

Figure 1:
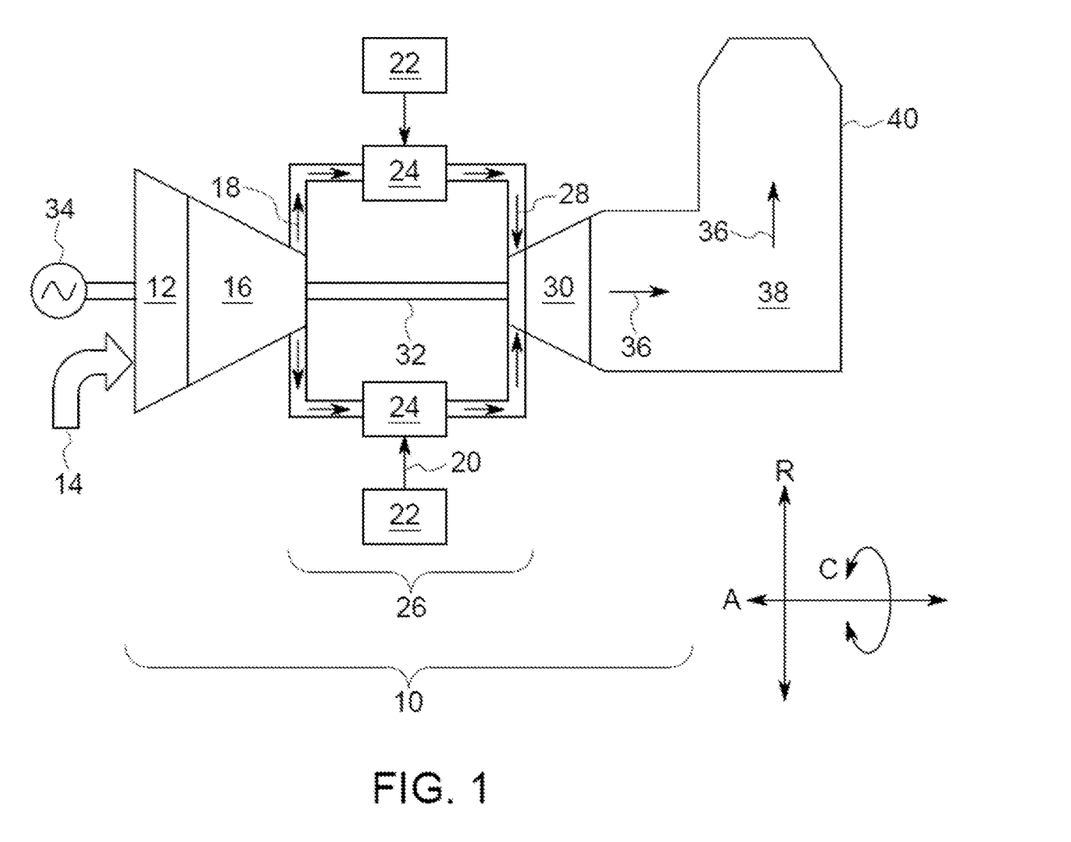
FIG. 1 is a functional block diagram of a gas turbine, in which the present combustor cap assembly may be employed.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of combustors for a land-based power-generating gas turbine for purposes of illustration, one of ordinary skill in the art will readily appreciate that embodiments of the present disclosure may be applied to other locations within a turbomachine and are not limited to turbine components for land-based power-generating gas turbines, unless specifically recited in the claims.

Referring now to the drawings, FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22, such as a fuel skid, to form a combustible mixture within one or more combustors 24 of a combustion section 26 of the gas turbine 10. The combustible mixture is burned to produce combustion gases 28 having a high temperature, pressure, and velocity. The combustion gases 28 flow through a turbine 30 of a turbine section to produce work. For example, the turbine 30 may be connected to a shaft 32, so that rotation of the turbine 30 drives the compressor 16 to produce the compressed working fluid 18. Alternately, or in addition, the shaft 32 may connect the turbine 30 to a generator 34 for producing electricity.

Exhaust gases 36 from the turbine 30 flow through an exhaust section 38 that connects the turbine 30 to an exhaust stack 40 downstream from the turbine 30. The exhaust section 38 may include, for example, a heat recovery steam generator (not shown) for cleaning and extracting additional heat from the exhaust gases 36 prior to release to the environment. The heat recovery steam generator may be coupled to a steam turbine to produce a combined cycle power plant, as is well known in the art.

Figure 2:
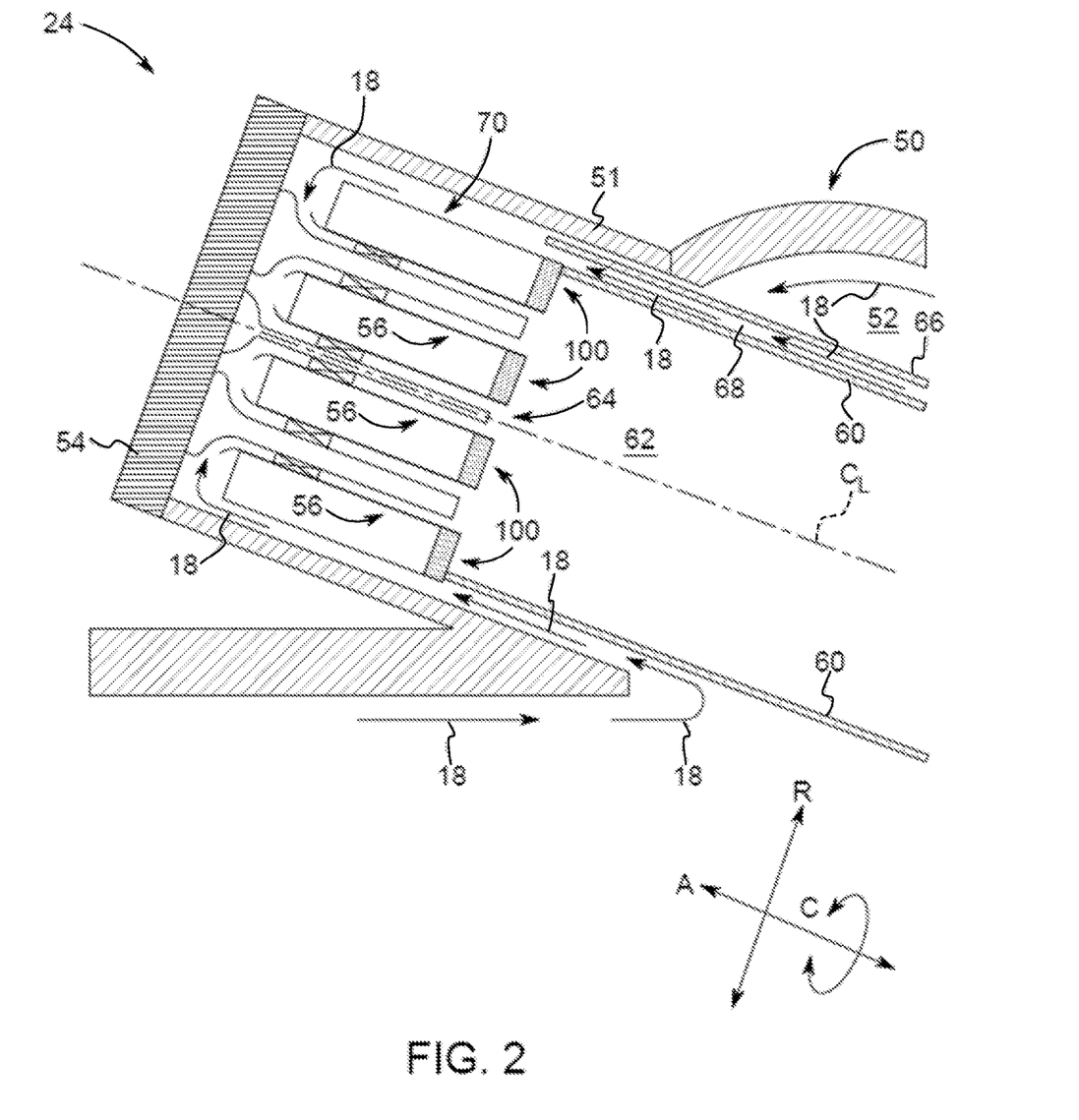
FIG. 2 is a cross-sectional side view of a portion of the combustor of FIG. 1, including the present combustor cap assembly.

FIG. 2 provides a cross-sectional side view of a portion an exemplary combustor 24 of the gas turbine 10 as may incorporate various embodiments of the present cap assembly. As shown in FIG. 2, the combustor 24 includes an outer casing 50, such as a compressor discharge casing, disposed downstream from the compressor 16. The outer casing 50 at least partially surrounds the combustor 24 and at least partially defines a high-pressure plenum 52 that at least partially surrounds the combustor 24. The high-pressure plenum 52 is in fluid communication with the compressor 16 and receives the compressed working fluid 18 from the compressor 16 during operation of the gas turbine 10.

An end cover 54 may be connected to the outer casing 50. In particular combustor designs, the end cover 54 is in fluid communication with the fuel source 22. A fuel nozzle 56 in fluid communication with the end cover 54 and/or the fuel source 22 extends downstream from the end cover 54. The fuel nozzle 56 extends generally axially through a cap assembly 100 disposed within the outer casing 50 opposite the end cover 54. The cap assembly 100 defines an upstream boundary of a combustion chamber 62 within the combustor 24.

An annular liner 60, such as a combustion liner or transition duct, at least partially defines the combustion chamber 62 within the combustor 24 downstream from the cap assembly 100, which includes an outlet end 64 of the fuel nozzle 56. A flow sleeve 66 may circumferentially surround at least a portion of the liner 60. The flow sleeve 66 is radially separated from the liner 60, and a flow passage 68 is defined between the liner 60 and the flow sleeve 66. The flow passage 68 is in fluid communication with the combustion chamber 62 via a head end portion 70 of the combustor 24. The head end portion 70 may be at least partially defined by the end cover 54 and a forward portion 51 of the outer casing 50.

Figure 3:
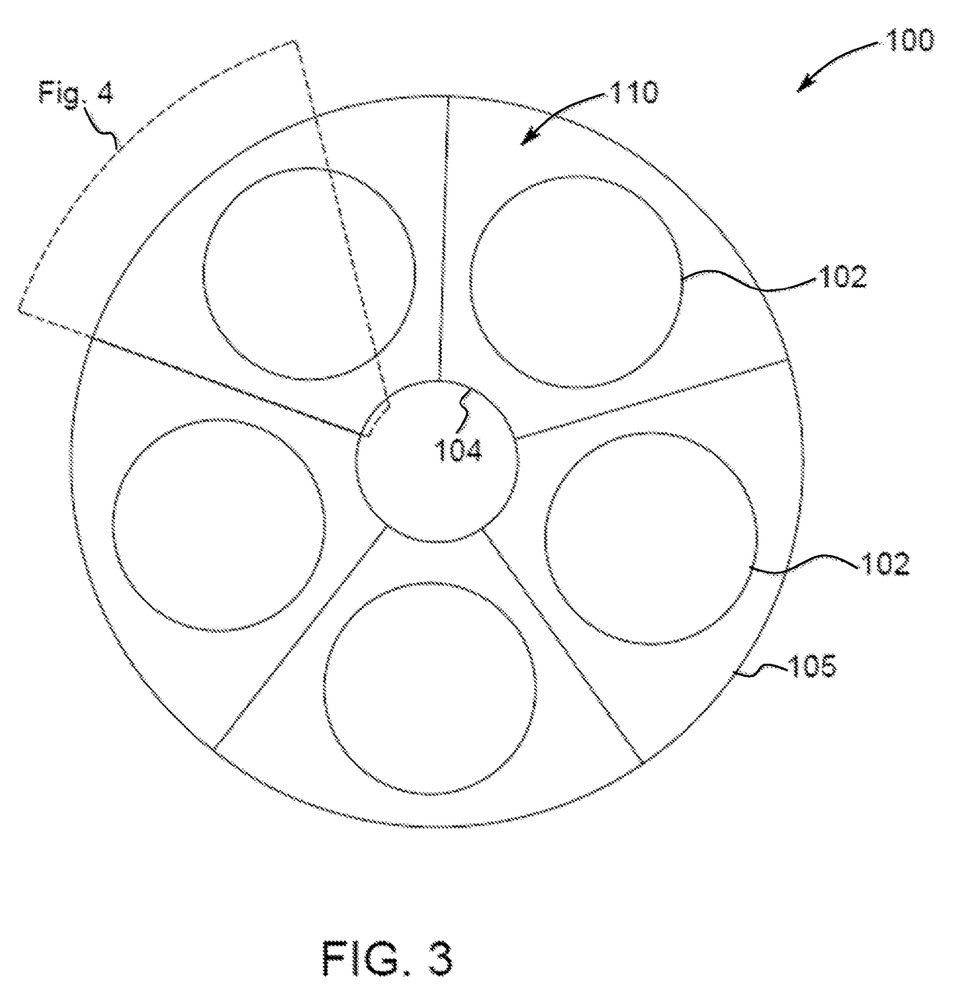
FIG. 3 is a plan view of the present combustor cap assembly.

FIG. 3 illustrates an aft-looking-forward view of the combustor cap assembly 100. The cap assembly 100 includes a circular plate 110 through which a plurality of fuel nozzle openings 102, 104 are defined. In this exemplary arrangement, a center fuel nozzle opening 104 is surrounded by five outer fuel nozzle openings 102, although other arrangements may instead be used (including arrangements with no center fuel nozzle opening 104 and arrangements with different numbers of outer fuel nozzle openings 102).

Figure 4:
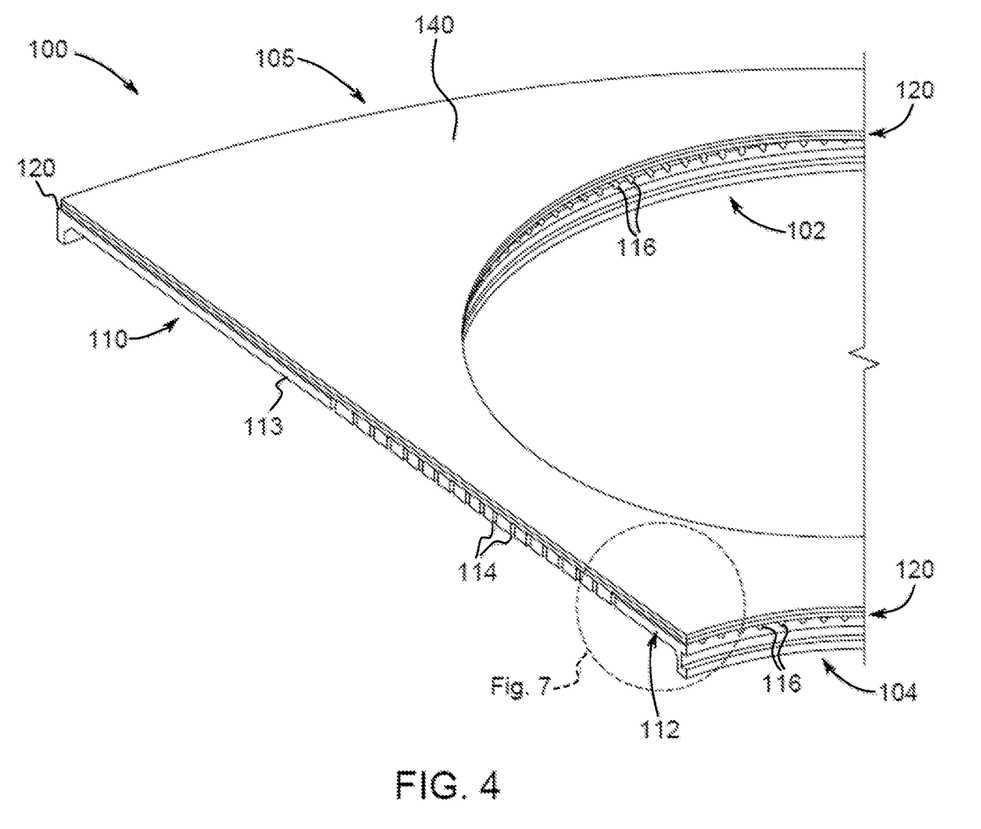
FIG. 4 is a perspective view of a portion of the present combustor cap assembly annotated in FIG. 3, illustrating an aft (or hot) side of the cap assembly.
Figure 8:
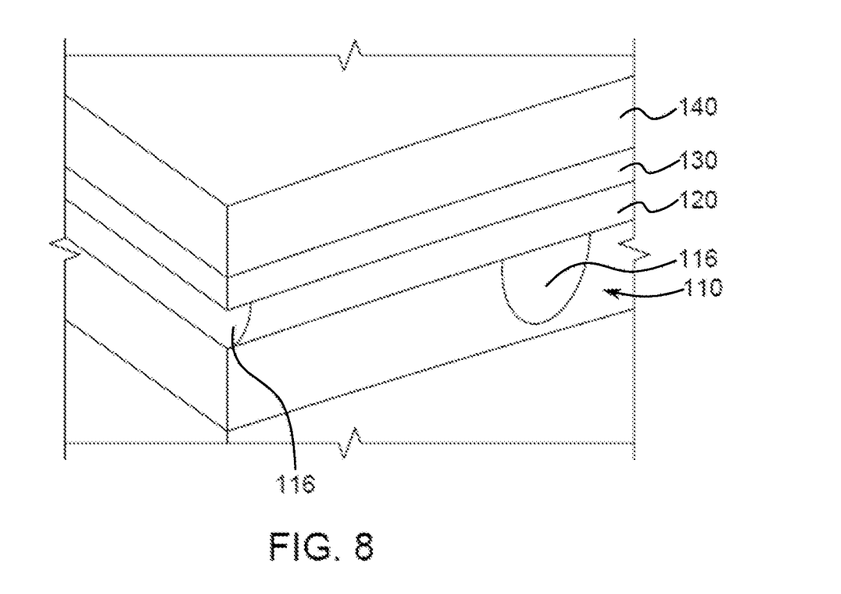
FIG. 8 is an enlarged perspective view of a portion of the combustor cap assembly of FIG. 7.

FIG. 4 illustrates a portion of the cap assembly 100 of FIG. 3. The cap assembly 100 includes the circular cap plate 110, which is part of a composite structure that includes a cover panel 120 and that may further include a bond coat 130 applied to the cover panel 120 and a thermal barrier coating 140 applied to the bond coat 130 (as shown in FIG. 8). One of the circular cap plate 110 and the cover panel 120 include a plurality of cooling microchannels 112 (shown in FIG. 5 as part of the cap plate 110). The cover panel 120 is a solid panel with no cooling holes therethrough, which permits the thermal barrier coating 140 to likewise be a continuous barrier layer.

Figure 5:
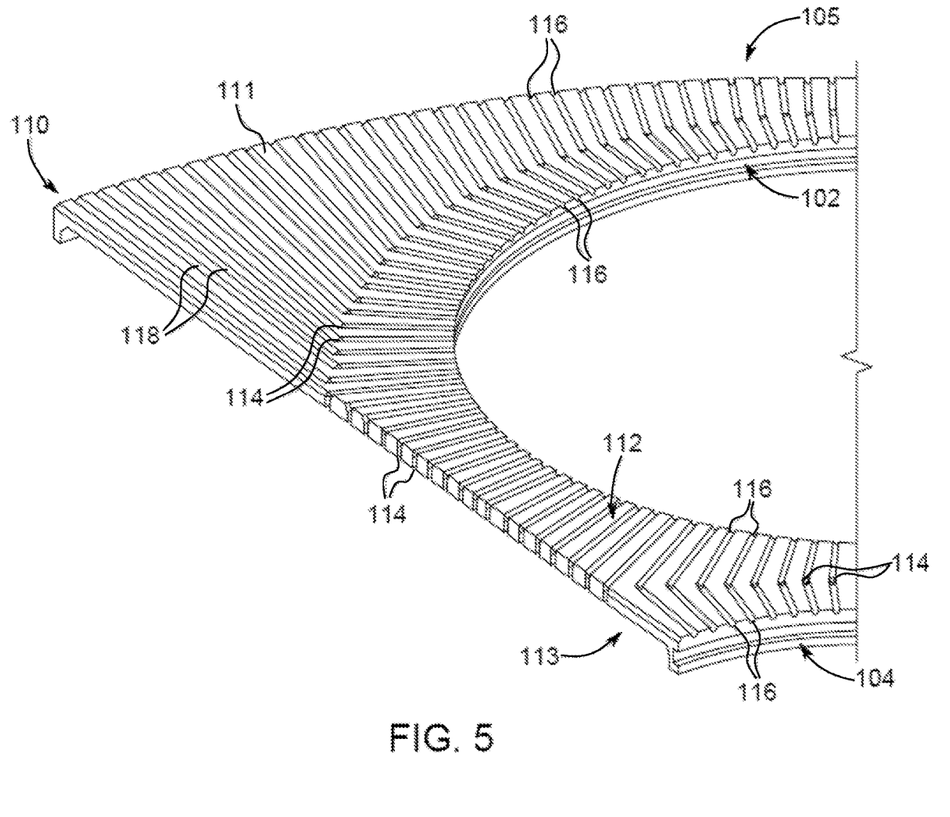
FIG. 5 is a perspective view of a portion of a cap plate of the present combustor cap assembly of FIG. 4, as viewed from an aft (hot) side of the cap plate.
Figure 6:
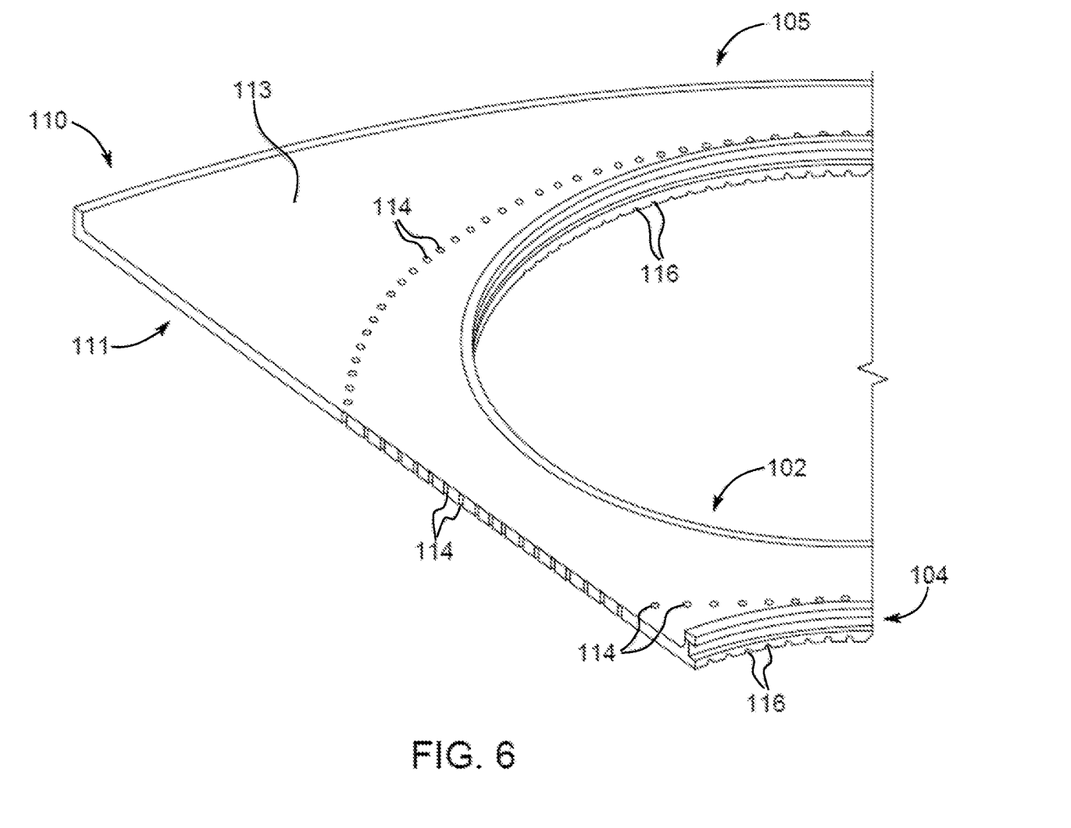
FIG. 6 is a perspective view of a portion of the cap plate of the present combustor cap assembly of FIG. 4, as viewed from a forward (cold) side of the cap plate.

Each cooling microchannel 112 has a channel inlet 114, a channel outlet 116, and a passage 118 between the channel inlet 114 and the channel outlet 116 (shown in FIG. 5). In one embodiment, the channel inlets 114 are disposed in an axial direction (relative to a centerline of the combustor 24) into the cap plate 110 from a cold side surface 113 (that is, the surface distal to the combustion chamber 62), as shown in FIG. 6. The channel outlets 116 are disposed in a radial or transverse direction (relative to the centerline of the combustor 24 or the cap assembly 100) from the cap plate 110. In the illustrated embodiment, some of the microchannels 112 terminate in channel outlets 116 in the fuel nozzle openings 102, 104, where the microchannels provide cooling and purge air to the fuel nozzles. In the illustrated embodiment, other microchannels 112 have channel outlets 116 located along the outer perimeter 105 of the cap plate 110, where the microchannels provide cooling and purge air to the cap outer seal.

Advantageously, the cooling air directed through the cooling microchannels 112 performs two functions. First, as the air passes through the cooling microchannels 112, the air convectively cools the cap plate 110 of the cap assembly 100. Then, the air is used to cool and/or purge the fuel nozzle openings 102, 104 and a seal (not shown) that surrounds the perimeter 105 of the cap assembly 100. Because a single volume of air is employed for these two purposes, the overall volume of cooling air required for the head end 70 is reduced. This reduction in secondary flows and the greater cooling efficiency increase the turbine efficiency of the gas turbine 10.

While reference is made herein to cap assemblies in which the cooling microchannels 112 are used to purge and cool both the fuel nozzle openings 102, 104 and the perimeter 105 of the cap assembly 100, it should be understood that the cooling microchannels 112 may be used to purge and cool only the fuel nozzle openings 102 and/or 104 or only the perimeter 105.

FIG. 5 illustrates a hot side surface 111 of the cap plate 110 on which the cooling microchannels 112 are defined. For example, the cooling microchannels 112 may be produced by high-speed milling. In this exemplary arrangement, the passages 118 of the cooling microchannels 112 are linear (i.e., straight) segments of uniform depth and are relatively short (less than 4 inches or 10 centimeters). In other embodiments, the passages 118 may be curvilinear. Shorter microchannels 112 may be used in areas of higher temperature. Each channel inlet 114 may direct cooling air into the passages 118 of two cooling microchannels 112. Alternately, each channel inlet 114 may direct cooling air into a single cooling microchannel 112.

FIG. 6 illustrates the cold side surface 113 of the cap plate 110, which defines the channel inlets 114. In the exemplary embodiment, the channel inlets 114 are defined in a single row around the outer fuel nozzle openings 102. Alternately, the channel inlets 114 may be disposed in other locations or in multiple rows (for example, if each channel inlet 114 is associated with a single passage 118).

Figure 7:
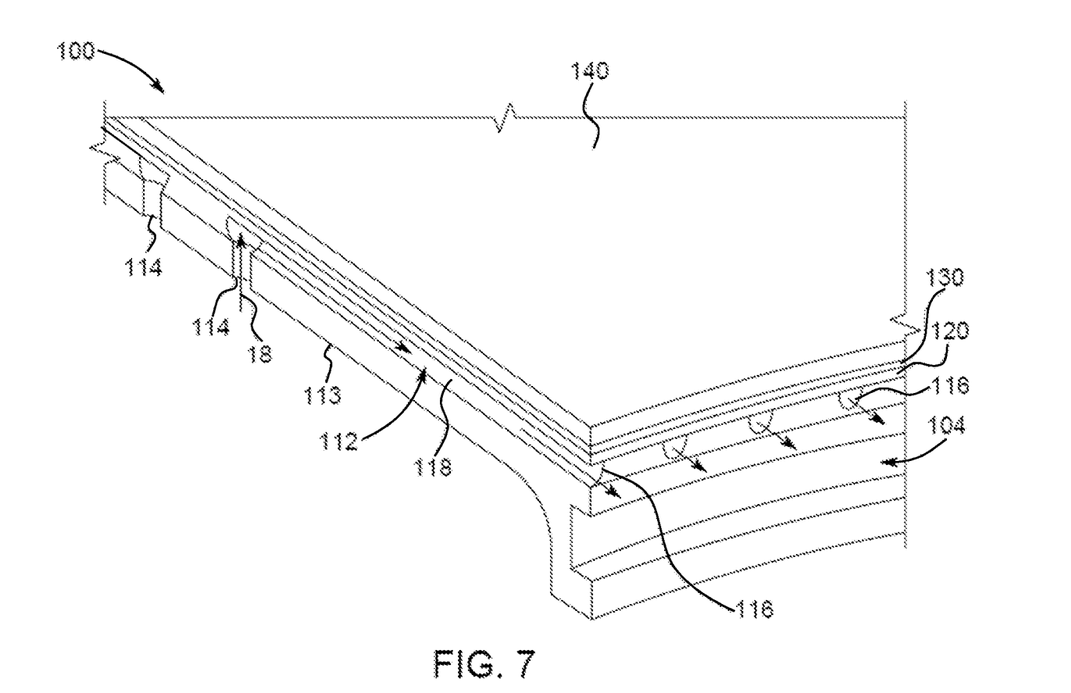
FIG. 7 is an enlarged perspective view of an area of the combustor cap assembly annotated in FIG. 4.
Figure 10:
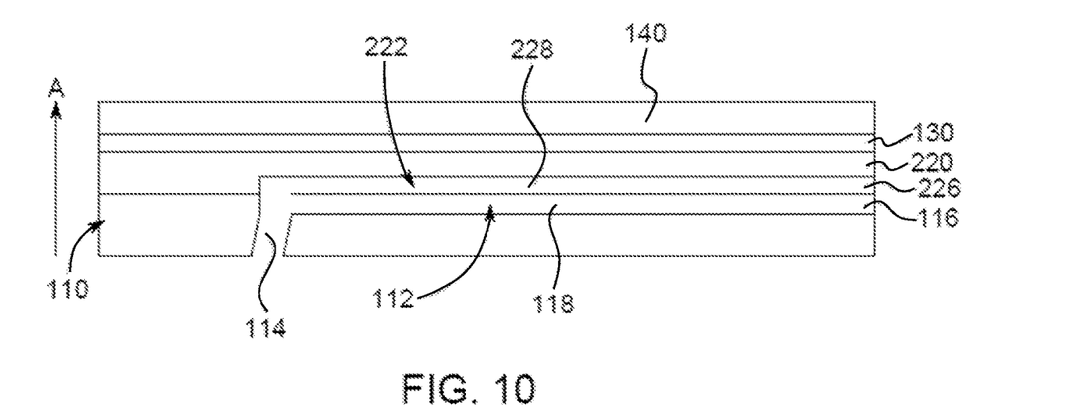
FIG. 10 is a schematic cross-sectional view of a cooling microchannel, as may be used with the present combustor cap assembly, according to yet another aspect of the present disclosure.

FIG. 7 is an enlarged view of a portion of the cap assembly 100. The cap plate 110 defines a plurality of cooling microchannels 112, which include the axially oriented channel inlets 114, the transverse cooling passages 118, and the channel outlets 116 oriented radially with respect to the fuel nozzle opening 104. In an exemplary embodiment, the channel inlets 114 are normal (i.e., perpendicular) to the cold side surface 113, and the channel outlets 116 are normal to the fuel nozzle opening 102, 104 or the outer perimeter 105. Alternately, the channel inlets 114 and/or the channel outlets 116 may be oriented at an angle ("canted") relative to the surfaces in which the channel inlets 114 and/or the channel outlets 116 are located (as shown in FIG. 10). Further, it should be understood that some of the channel inlets 114 or the channel outlets 116 may be oriented normal to the surfaces, while others of the channel inlets 114 or the channel outlets 116 may be oriented at an angle other than 90-degrees.

FIGS. 7 and 8 illustrate the layers of the combustor cap assembly 100. The cap plate 110 is made of durable metal or metal alloy. The cover panel 120, which may be a substantially solid plate, may define a top surface of the cooling microchannels 112 in the cap plate 110. In one embodiment, the cover panel 120 may be made from a pre-sintered preform ("PSP") material that typically exhibits a low degree of shrinkage. The cover panel 120 may be cut from a pre-sintered preform plate, tack-welded to the cap plate 110, and vacuum brazed. In another embodiment, the cover panel 120 may be made of a superalloy sheet or plate that is diffusion-bonded to the cap plate 110.

More specifically, the pre-sintered preform material may include a mixture of a superalloy powder, a brazing alloy powder, and a binding agent, where the superalloy powder and the brazing alloy powder have different melting points. Examples of superalloys include, but are not limited to, IN-713, IN-718, IN-738, IN-939, Hastelloy X, Haynes 188, Haynes 230, Rene 77, Rene 80, Rene 142, and the like. Examples of braze alloys include, but are not limited to, D-15, DF-4B, BNi-9, BNi-5, B-93, and the like. The proportions of the superalloy powder to the brazing alloy powder may vary.

Optionally, a thermal barrier coating 140 may be applied to the cap assembly 100 to enhance the durability of the cap assembly 100. A bond coat 130 may be positioned between the cover panel 120 and the thermal barrier coating 140 to promote adhesion of the thermal barrier coating 140.

Conventional cap assemblies often include an effusion plate, which includes an array of effusion cooling holes. The downstream surface of the effusion plate is cooled by air passing through the effusion cooling holes and into the combustion zone. Because the effusion cooling holes are very small and because they are distributed in a large number across the effusion plate, coating the effusion plate has been difficult to achieve without blocking the effusion cooling holes and without the additional step of drilling through the thermal barrier coating to unblock the effusion cooling holes.

In contrast, because the cap assembly 100 is cooled without the use of effusion cooling holes, the coating of the cap assembly 100 is greatly simplified and readily achievable. Moreover, if the thermal barrier coating 140 shows signs of wear after an operation period of the combustor 24, the cap assembly 100 may be removed, and the thermal barrier coating 140 may be stripped from the cover panel 120. New layers of the bond coat 130 and the thermal barrier coating 140 may then be applied, thereby extending the useful life of the cap assembly 100.

Figure 9:
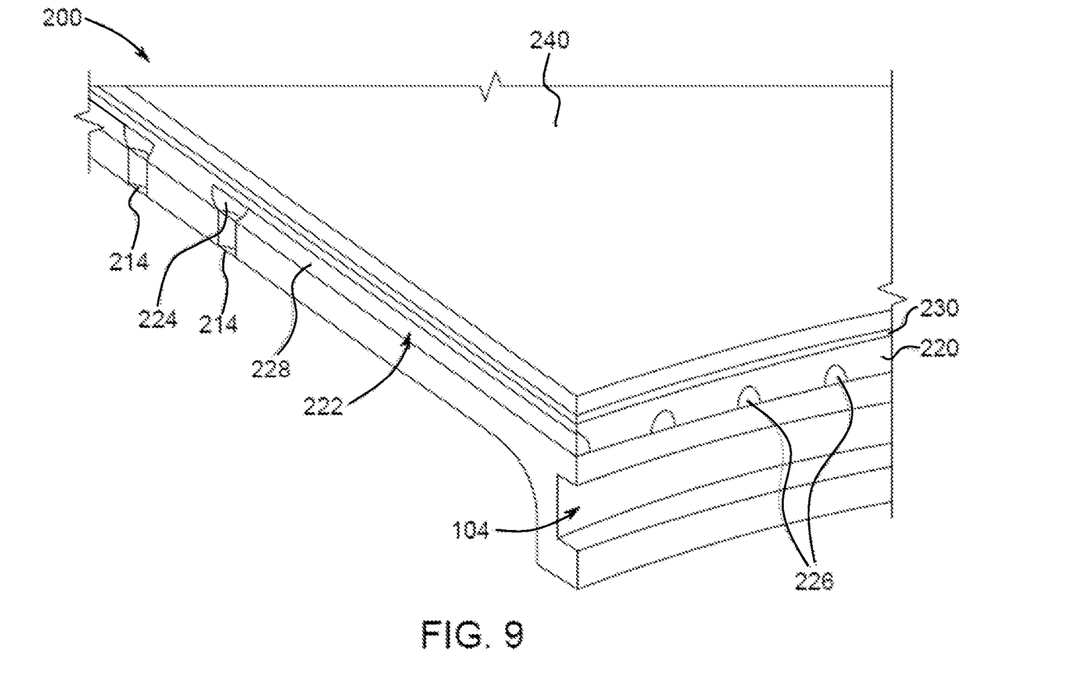
FIG. 9 is an enlarged perspective view of an area of the combustor cap assembly annotated in FIG. 4, according to an alternate embodiment of the cap assembly provided herein.

FIG. 9 describes an alternate cap assembly 200, which includes a cap plate 210, a cover panel 220, a bond coat 230, and a thermal barrier coating 240. In this embodiment, a plurality of cooling microchannels 222 is defined in the cover panel 220 rather than in the cap plate 210. Each cooling microchannel 222 has a forward end 224, a channel outlet 226, and a flow passage 228 extending between the forward end 224 and the channel outlet 226. A channel inlet 214, which is defined through the cap plate 210, is in fluid communication with the forward end 224 of the cooling microchannel 222 and directs cooling air into the microchannel 222.

The cooling microchannels 222 are disposed along the cold side surface of the cover panel 220, which is contact with the cap plate 210. The cooling microchannels 222 may be produced by mechanical or electrical discharge machining (EDM) or as part of an additive manufacturing process, using techniques such as direct metal laser melting (DMLM) or direct metal laser sintering (DMLS).

Alternately, as shown in FIG. 10, complementary microchannels 112, 222 may be defined in both the hot side surface 111 of the cap plate 110 and the cold side surface of the cover panel 220. In this embodiment, the channel inlets 114 are defined through the cap plate 110 and the flow passages 118, 228 are defined along the respective contacting surfaces of the cap plate 110 and the cover panel 220. In some instances, one or more of the channel inlets 114 may be disposed at an angle relative to an axial centerline of the cap assembly 100. The channel outlets 116 are likewise defined through both the cap plate 110 and the cover panel 220 and are disposed around the perimeter of the fuel nozzle openings 102, 104 and the perimeter of the cap assembly 100, 200. In some instances, one or more of the channel outlets 116 may be disposed at an angle relative to an axial centerline of the cap assembly 100, which may or may not be the same angle as that of the angled channel inlet(s) 114.

Exemplary embodiments of the present combustor cap assembly are described above in detail. The cap assemblies described herein are not limited to the specific embodiments described herein, but rather, components of the cap assembly may be utilized independently and separately from other components described herein. For example, the cooling microchannels described herein may have other applications not limited to practice with cap assemblies for power-generating gas turbines, as described herein. Rather, the cooling microchannels and cap assemblies described herein can be modified for implementation in various other industries.

While the technical advancements have been described in terms of various specific embodiments, those skilled in the art will recognize that the technical advancements can be practiced with modification within the spirit and scope of the claims.

What is claimed is:

1. A combustor cap assembly comprising:
   a cap plate defining an outer perimeter and a plurality of fuel nozzle openings disposed through the cap plate, the cap plate having a hot side; and
   a cover panel having a cold side, the cold side being attached to and in direct contact with the hot side of the cap plate;
   wherein the hot side of the cap plate and/or the cold side of the cover panel define a plurality of cooling microchannels extending in a transverse direction relative to a centerline of the combustor cap assembly; and
   wherein a first microchannel of the plurality of cooling microchannels has a first channel outlet disposed within one of the plurality of fuel nozzle openings and, optionally, a second microchannel of the plurality of cooling, microchannels has a second channel outlet disposed along the outer perimeter of the cap plate.

2. The combustor cap assembly of claim 1, wherein the hot side of the cap plate defines the plurality of cooling microchannels.

3. The combustor cap assembly of claim 1, further comprising a bond coat applied to the cover panel and a thermal barrier coating applied to the bond coat.

4. The combustor cap assembly of claim 1, wherein each cooling microchannel of the plurality of cooling microchannels comprises a channel inlet disposed through a cold side of the cap plate, each channel inlet being oriented in an axial direction relative to the centerline of the combustor cap assembly.

5. The combustor cap assembly of claim 4, wherein each channel inlet feeds two cooling microchannels of the plurality of cooling microchannels.

6. The combustor cap assembly of claim 1, wherein a plurality of channel inlets is defined through a cold side of the cap plate; and wherein a portion of the plurality of channel inlets is disposed circumferentially around and radially spaced from one of the plurality of fuel nozzle openings.

7. The combustor cap assembly of claim 1, Wherein each cooling microchannel of the plurality of cooling microchannels comprises a channel inlet disposed through a cold side of the cap plate; and wherein at least one cooling microchannel of the plurality of cooling microchannels has a respective channel inlet oriented at an angle relative to the centerline of the combustor cap assembly.

8. The combustor cap assembly of claim 1, Wherein at least one cooling microchannel of the plurality of cooling microchannels comprises a respective cooling passage extending between a respective channel inlet and a respective channel outlet; and wherein the respective channel inlet is defined through a cold side of the cap plate, and wherein the respective cooling passage extends in the transverse direction to the respective channel outlet.

9. The combustor cap assembly of claim 1, wherein the cover panel is a pre-sintered preform material comprising a first superalloy powder material with a first melting point, a second brazing alloy powder material with a second melting point different from the first melting point, and a binding agent.

10. A combustor comprising: a combustor liner defining a combustion zone: and a combustor head end upstream of the combustor liner, the combustor head end comprising: a combustor cap assembly coupled to the combustor liner and defining an upstream boundary of the combustion zone, the combustor cap assembly comprising: a cap plate defining an outer perimeter and a plurality of fuel nozzle openings disposed through the cap plate, the cap plate having a hot side; and a cover panel having a cold side, the cold side being attached to and in direct contact with the hot side of the cap plate; wherein at least one of the hot side of the cap plate and/or the cold side of the cover panel define a plurality of cooling microchannels extending in a transverse direction relative to a centerline of the combustor cap assembly; and
wherein a first microchannel of the plurality of cooling microchannels has a first channel outlet disposed within one of the plurality of fuel nozzle openings and, optionally, wherein a second microchannel of the plurality of cooling microchannels has a second channel outlet disposed along the outer perimeter of the cap plate; and
a plurality of fuel nozzles extending through the plurality of fuel nozzle openings.

11. The combustor of claim 10, wherein the hot side of the cap plate defines the plurality of cooling microchannels.

12. The combustor of claim 10, further comprising a bond coat applied to the cover panel and a thermal barrier coating applied to the bond coat.

13. The combustor of claim 10, wherein each cooling microchannel of the plurality of cooling microchannels comprises a channel inlet disposed through a cold side of the cap plate, each channel inlet being oriented in an axial direction relative to the centerline of the combustor cap assembly.

14. The combustor of claim 13, Wherein each channel inlet feeds two cooling microchannels of the plurality of cooling microchannel.

15. The combustor of claim 10, wherein a plurality of channel inlets is defined through a cold side of the cap plate; and wherein a portion of the plurality of channel inlets is disposed circumferentially around and radially spaced from one of the fuel nozzle openings of the plurality of fuel nozzle openings.

16. The combustor of claim 10, wherein each cooling microchannel of the plurality of cooling microchannels comprises a channel inlet disposed through a cold side of the cap plate; and wherein at least one cooling microchannel of the plurality of cooling microchannels has a respective channel inlet oriented at an angle relative to the centerline of the combustor cap assembly.

17. The combustor of claim 10, wherein at least one cooling microchannel of the plurality of cooling microchannels comprises a respective cooling passage extending between a respective channel inlet and a respective channel outlet; and wherein the respective channel inlet is defined through a cold side of the cap plate, and wherein the respective cooling passage extends in the transverse direction to the respective channel outlet.

18. The combustor of claim 10, wherein the cover panel is a pre-sintered preform material comprising a first superalloy powder material with a first melting point, a second brazing alloy powder material with a second nicking point different from the first melting point, and a binding agent.

* * * * *